J. P. M. MALLEVILLE.
UNIVERSAL CLAMPING RING.
APPLICATION FILED MAY 31, 1913.
1,111,479.
Patented Sept. 22, 1914.
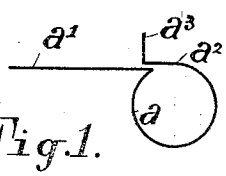
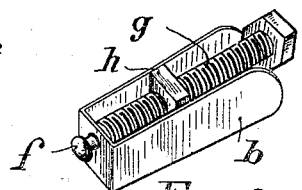
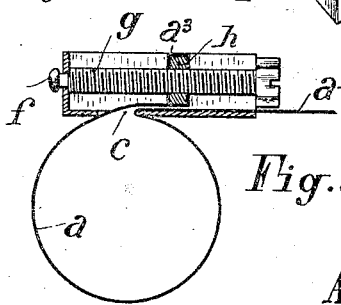
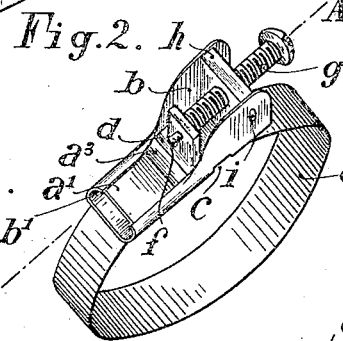
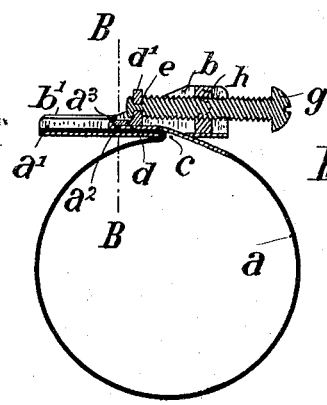
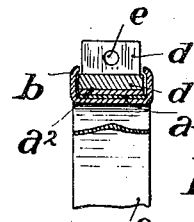
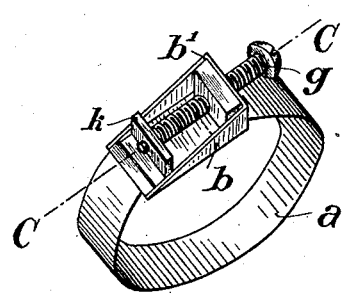
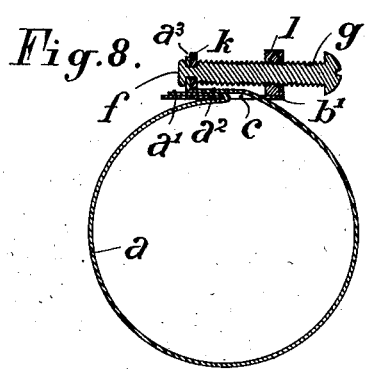
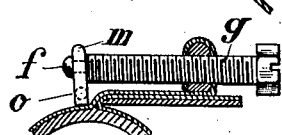
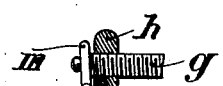

UNITED STATES PATENT OFFICE.

JEAN PAUL MARIE MALLEVILLE, OF PARIS, FRANCE.

UNIVERSAL CLAMPING-RING.

1,111,479.   Specification of Letters Patent.   Patented Sept. 22, 1914.

Application filed May 31, 1913. Serial No. 771,065.

*To all whom it may concern:*

Be it known that I, JEAN PAUL MARIE MALLEVILLE, a citizen of the French Republic, residing at Paris, in France, have invented certain new and useful Improvements in Universal Clamping-Rings, of which the following is a specification, reference being had therein to the accompanying drawing.
This invention relates to universal clamping rings of that class in which the clamping action takes place on the whole circumference of the member to be clamped therein whatever might be its diameter, and it has for its object to provide improved means whereby the flexible band of such rings can be of any length with no apertures, as it has been found that the boring of holes in the band is often prejudicial specially in cases of large diameter, since they act against a tight clamping owing to the fact that the rubber is pressed into such holes and forms projections prejudicial to the smoothness of the surface of the rubber.
On the other hand the rings or collars made according to this new construction are much of a uniform width and can thus be used for many purposes, when for instance the neck for connection with a hose pipe is provided with a regular circumferential groove for receiving the clamping ring.

Various forms of constructions of clamping ring embodying the invention are illustrated by way of example in the annexed drawings in which.

Figure 1 is a diagrammatical view of a clamping ring constructed according to the invention, whereby the principle of the invention will be readily understood. Fig. 2 is a perspective view of the frame of a standard ring with movable nut, Fig. 2ª is a modification thereof. Fig. 3 is a cross section of the same ring complete. Fig. 4 is a perspective view of a standard ring complete with stationary nut for a band with or without holes. Fig. 5 is a section on the line A—A in Fig. 4. Fig. 6 is a cross section on the line B—B in Fig. 5. Fig. 7 is a perspective view of a modified construction of standard ring with stationary nut. Fig. 8 is a section on the line C—C in Fig. 7, and Figs. 8ª, 9 and 10 illustrate other modifications of the invention.

The principle of the invention will be readily understood by referring to Fig. 1 in which it can be seen that the band $a$, of an unlimited length, is folded up automatically when brought to position in order to form a free end $a^1$ while the other end, directed as at $a^2$, is bent at $a^3$ so as to be made integral with a small plate or nut. Starting from this principle whereby a contact may be made operative on the entire circumference of the article to be clamped, the device may be constructed in two principal forms viz: 1° with stationary nut and movable plate or 2° with movable nut and stationary plate. Thus, the following description will be made on these data. An arrangement with movable nut is shown in Figs. 2 and 3 in which the band $a$ is passed through a straight or curved slot in the frame $b$, and has its end $a^3$ turned about the nut $h$ in which engages the screw $g$ formed at its end with a nipple $f$ which may also be connected with a pivoted member $f^1$, as shown in Fig. 2ª, for instance for the purpose of facilitating the positioning of the parts. It will thus be understood that the part $a^3$ being turned around the nut and the part $a^1$ arranged as shown in Fig. 3, the more the nut will be moved by turning the screw $g$ through its head in the desired direction the tighter the band forming the ring will clamp the part on which it is placed.

An arrangement with stationary nut is shown in Figs. 4, 5 and 6, in which the plain flexible band $a$, without any holes in it, is combined with a frame or channeled connecting member $b$. In this example, the end $a^1$ of the band $a$ is folded up as shown in Fig. 5 and is passed through a slot $c$ of the frame $b$, and being fixed, it rests on the bottom of the channel shaped part between the bent up edges $b^1$ of the latter. The part $a^1$ can also be rigidly connected to the frame by riveting soldering or otherwise fixing it thereto. The movable end $a^2$ of the same band also passes through the slot $c$ of the frame $b$, bearing first on the end $a^1$ and is then folded up as at $a^3$ (Fig. 5) between the bent up edges $b^1$, and bears on the flat part of a square $d$ the other branch $d^1$ of which has a hole in which the plain end or riveted nipple $f$ of the screw $g$ can revolve. The head of the screw may be of any suitable shape and the screw itself may engage a nut of any proper form and be held in the thickness of the lugs of the frame $b$ by means of pins $i$ riveted or not. The nipple $f$ being riveted it can revolve in the hole $e$ without the screw coming out of engagement from the square $d\ d^1$.

The turned up edges or flanges $b^1$ of the channeled member $b$ are adapted to prevent the folded up part $a^3$ to be unfolded and to prevent the twisting of the flat part $a^1$ of the band, in order to guide the square $d\ d^1$ accurately in its motion during the clamping operation. The two ends $a^1$ and $a^2$ of the band $a$ bearing on each other it results therefrom that all slipping or raising up is thus prevented.

For tightening or loosening a clamping ring of this class it will only be necessary to turn the screw $g$ in either direction after the parts have been assembled as above described.

In the form of construction illustrated in Figs. 7 and 8, the ring $a$ is folded up as at $a^1$ to form the stationary end which bears on the bottom of the connecting frame $b$, after being passed through the slot $c$ of the latter. The movable end $a^2$ is also passed through the slot $c$ and bears on the part $a^1$ and is then bent as at $a^3$ and is provided with a hole in which the nipple $f$ of the screw $g$ can be engaged, as in the foregoing arrangement. On this nipple is the small plate $k$ which is so fitted thereon that it cannot again be disconnected therefrom. The screw is screwed, for instance into a nut $l$ held between the flanges of the frame $b$ and bearing against the inner surface of its bottom part $b^1$.

As in the previous example, the connecting frame $b$ prevents the twisting of the end $a^1$ of the band $a$ and can be provided with flanges of any other shape differing from that shown by way of example on the annexed drawing.

The way and manner of mounting this new clamping ring are the same as those described for the previous arrangement and the advantages thereof are much the same.

The arrangement shown in Fig. 8$^a$ can also be adopted in which the end $a^3$ of the band is turned around the small plate $k$, the nipple $f$ being then passed through two plies of the band with the small plate between such plies.

In cases where it is strictly necessary to have a close clamping or tightening on the whole circumference, as for instance in cases of very high pressure or when the elasticity of an interposed material may be relied upon, it will be preferable to use the arrangement shown in Figs. 9 and 10.

In the construction shown in Fig. 9, a pivoted piece $m$, disconnectible or not, bent or not, can be adapted to be used at the end of the screw $g$, and the point $o$ of which represents the fulcrum point in the flanges of the frame.

Referring to Fig. 10, the part $m$ is combined with a part $n$ sliding under the frame for the purpose of clearing the slot when the nut is in the position shown at $h$. In either case, at the end of the putting up operation, when the band is stretched, the reaction of the screw $g$ on the part $m$ revolving about the point $o$ causes the accurate juxtaposition of both band parts in the slot.

Having thus described and ascertained the nature of my invention and the manner in which it is to be performed what I claim is:

1. A clamping ring comprising a band having a reversely bent end, adjusting means including a frame engaging said end, and means on the frame connected with the other end of the band to move the latter along the first mentioned end in the direction in which the latter extends.

2. A clamping ring comprising a band having a reversely bent end and the other end overlapping said bent end, adjusting means including a frame having a bearing against said band at the angle of the bent end aforesaid, and means on the frame connected with the other end of the band to move the latter in the direction of reverse bending of the first-mentioned end.

3. A clamping ring comprising a band having a reversely bent end, adjusting means including a frame engaging said end, and means on the frame connected with the other end of the band to move the latter along the first mentioned end, said frame being provided with a slot through which both ends of the band pass.

4. A clamping ring comprising a band having a reversely bent end, adjusting means including a frame having a bearing against said band at the angle of the bent end aforesaid, and means on the frame connected with the other end of the band to move the latter longitudinally of the reversely bent end and toward its free extremity, said means consisting of a nut movable longitudinally of the frame and a screw operatively connected with the nut and the frame.

5. A clamping ring comprising a band having a reversely bent end portion, a frame provided with a slot through which said end portion of the band passes and having a bearing against the angle of the band formed by said bent end, a nut on the frame operatively connected with the band at its other end and movable along the bent end portion first-mentioned, and means on the frame for accomplishing relative movement of the nut and frame as described.

In testimony whereof I affix my signature in presence of two witnesses.

JEAN PAUL MARIE MALLEVILLE.

Witnesses:
VICTOR PRÉVOST,
HANSON C. COXE.